United States Patent [19]

Sanders

[11] 4,392,327

[45] Jul. 12, 1983

[54] PLANT GROWING UNIT, METHOD AND SYSTEM

[75] Inventor: Bernard Sanders, Jersey, Channel Islands

[73] Assignee: Bonar Horticulture, Ltd., Dundee, Scotland

[21] Appl. No.: 275,194

[22] Filed: Jun. 19, 1981

[30] Foreign Application Priority Data

Jun. 20, 1980 [GB] United Kingdom ................. 8020224

[51] Int. Cl.³ ............................................. A01G 31/00
[52] U.S. Cl. ............................................. 47/59; 47/81
[58] Field of Search ........................................ 47/59–64, 47/67, 81, 89, 79, 80, 82, 83, 84, 85, 86, 87, 58

[56] References Cited

U.S. PATENT DOCUMENTS

| | | | |
|---|---|---|---|
| 1,815,195 | 7/1931 | Favata | 47/67 |
| 3,395,486 | 8/1968 | Campbell et al. | 47/66 |
| 3,739,522 | 6/1973 | Greenbaum | 47/87 |
| 4,149,339 | 4/1979 | Hall et al. | 47/67 |
| 4,291,499 | 9/1981 | Prewer | 47/86 X |

FOREIGN PATENT DOCUMENTS

| | | | |
|---|---|---|---|
| 922106 | 3/1973 | Canada | 47/64 |
| 319387 | 4/1916 | Fed. Rep. of Germany | 47/81 |

Primary Examiner—James R. Feyrer
Attorney, Agent, or Firm—Leydig, Voit, Osann, Mayer and Holt, Ltd.

[57] ABSTRACT

The present invention provides a plant growing unit which is generally flexible and comprises upper and lower compartments formed of flexible polyethylene or other plastics materials. The flexible upper compartment constitutes a plant root-ball container open for upward growth of a plant when placed in the container, while the flexible lower compartment constitutes a reservoir for water optionally containing added fertilizer nutrients or other dissolved materials. Level restricting means, such as at least one aperture in the walls of the lower compartment, is provided for establishing a maximum level of water in the reservoir which in use of the unit results in an air space between the water level and the root-ball of a plant when in the container. The unit also has one or more openings between the upper and lower compartments allowing root growth from the container to the reservoir.

14 Claims, 3 Drawing Figures

PLANT GROWING UNIT, METHOD AND SYSTEM

The present invention relates to units for growing plants and to methods and systems of growing plants which employ the units.

According to the present invention there is provided a plant growing unit, the unit being generally flexible and comprising upper and lower compartments formed of flexible polyethylene or other plastics materials. The flexible upper compartment constitutes a plant root-ball container open for upward growth of a plant when placed in the container, while the flexible lower compartment constitutes a reservoir for water optionally containing added fertilizer, nutrients or other dissolved materials. Level restricting means, such as at least one aperture in the walls of the lower compartment, is provided for establishing a maximum level of water in the reservoir which in use of the unit results in an air space between the water level and the root-ball of a plant when in the container. The unit also has one or more openings between the upper and lower compartments allowing root growth from the container to the reservoir.

The present invention thus provides a flexible plant growing unit which can offer considerable advantages over the known plant growing systems constructed from moulded plastics or other rigid material and comprising a rigid plant container mounted over a trough of water. In particular, the units of the present invention can readily be produced at an economically favourable cost. Their flexible nature allows the units to assume a generally flat form which facilitates packaging, storage, transportation and display of the units before use. Furthermore, the units of the invention are especially suited for use on a large scale.

The grow a plant using a unit of the invention, the root-ball itself or contained in a root-permeable container is placed in the upper compartment and the unit is supported, normally with the lower compartment resting on the ground or other surface. Water usually supplemented with nutrients is added to the unit until the intended water level is established with an air space between the water and the root-ball. The water can be poured directly into the lower compartment or through the upper compartment and openings leading to the lower compartment, and is topped up as necessary at intervals or on a continuous basis.

In some circumstances, the moist atmosphere in the air space may be sufficient to encourage the roots of the plant to extend through the openings and across the air space, thereby to allow the plant to receive water from the lower compartment. Alternatively, and more usually, it is greatly preferred to avoid relying on the roots to bridge the air space.

Thus, it is greatly preferred that the units of the invention further include a flexible water carrier of flexible capillary material which in use of the unit bridges the air space. Examples of suitable flexible capillary materials comprise woven or non-woven fibrous or other absorbent material. The water carrier acts as a capillary wick, and can for instance take the form of a strip or a web of the flexible capillary material.

Suitable sizes for the upper and lower compartments can be selected in accordance with the intended size of the plant. For most purposes, a volume ratio for reservoir:container of between 4:1 and 1:4 is preferred, with the reservoir usually having a volume about the same as or less then the root-ball container. Moreover, the volume ratio for reservoir:air space will usually be about 10:1 to 1:2, though as with the ratio for reservoir:container these figures are not critical for success. For example, if the root-ball in the container can take up air adequately from the upper compartment then the volume of the air space can be further reduced relative to the reservoir.

In view of their generally flexible nature, the units of the invention will usually not be free-standing. Accordingly, support means is preferably provided for suspending the units. The support means can suitably comprise a support wire to which the units may be fixed. Fixing can be for example by stapling of the material, or using a hanger made for instance of plastics coated wire and engageable with the upper part of a unit.

For one preferred embodiment of the invention, the plant growing unit comprises a flexible envelope with a generally horizontal interrupted division serving locally to join together opposite walls of the envelope and thereby create the upper and lower compartments. The division has gaps which form the openings to allow root growth from the container to the reservoir. Suitably there is at least one aperture in the lower compartment to determine the maximum water level and ensure the air space. It is much preferred that such units incorporate a water carrier which extends across the division and bridges the air space.

For another preferred embodiment of the invention, the plant growing unit comprises two envelopes, one within the other and joined together at a common opening at the top. The inner envelope will be shorter than the outer one and forms the upper compartment, while the lower compartment is formed by the bottom part of the outer envelope. The bottom part of the inner envelope has the openings which allow root growth from the container to the reservoir, and there is at least one aperture in the lower compartment to determine the maximum level and ensure the air space. It is much preferred that such units incorporate a water carrier which passes through the openings in the bottom of the inner envelope and bridges the air space.

The plant growing units of the invention are preferably constructed from a single sheet of plastics material by folding, welding, and cutting or punching. Thus, for example, units in accordance with the preferred embodiment having a division in a single envelope can be made by folding in half the sheet of plastics materials, optionally with a web or strip of capillary material interposed between the folded halves; welding the material to itself at least for part of the length of the two sides extending from the fold line; welding, stitching, stapling ot otherwise securing the material intermittently to itself along a division line parallel to the fold line and extending from one side to the other; and punching or cutting out or otherwise forming the or each aperture.

Alternatively, the plant growing units of the invention can be constructed from blown tubular film, or from more than one sheet of plastics material. Thus, for example, units in accordance with the preferred embodiment having two envelopes can be made from tubular film by inward tucking of the film using three folds generally parallel to the axis of the tube and flattening of the tube at a fourth fold, so that the tuck forms an inner envelope within an outer envelope; welding the tube to itself across the axis for at least part of the length of the two sides extending from the fourth fold; cutting or otherwise forming one or more slits parallel to the sides and through the outer and inner envelope simultaneously to cut one or more apertures in the outer envelope and one or more openings in the bottom of the inner envelope; and optionally inserting into the inner envelope a wick of capillary material to act as a water carrier.

In general, the units of the present invention can be made from continuous sheets or films of plastics material, and, if appropriate, webs of capillary material. Although the individual units can be separated from each other after the appropriate folding, welding and other operations, this is not essential.

For large-scale use, the invention provides a plant growing system. Such a system can comprise a multiplicity of plant growing units of the invention. The units are preferably partly or fully joined together at their sides, with there suitably being a join at the lower part of each lower compartment. The join can extend to just below the water level, so that water flow between the reservoirs is possible. Units joined at the lower compartment may share a common upper compartment. There may be at least one hundred, more typically at least one thousand units in the system; the user then installs suitable lengths of the system to fit his growing area.

The systems of the invention can be made as a roll or folded length, and are thus easy to handle and transport. In use, the roll or folded length is unrolled or unfolded and optionally divided into smaller multiples of the units, possibly even into individual units. As a further modification, single lengthy units may be employed for large scale use, with a single reservoir and a single root-ball container.

If desired, and in order to exclude light, the unit can be opaque, preferably with the outside being white or some other colour which does not readily absorb radiant heat. For a unit constructed from a single sheet of plastics material, this can be achieved by employing a sheet which is black on one side and white on the other, for example, coextruded white and black polyethylene film.

The plant growing units of the invention can further comprise a coating or removable sleeve or cover to modify heat absorption and emission by the units. For instance, aluminium foil can be employed for use in high-radiation climates or of black flexible material, for example polyethylene film, for cooler climates. A sleeve or cover may be removably placed over the unit, thereby concealing the outer surface of the unit: this permits modification in the rate of transfer of heat to or from the roots in the container as well as to or from the water in the reservoir.

Embodiments of the present invention will be described, by way of example, with reference to the accompanying drawings, in which.

Figures 1, 3:
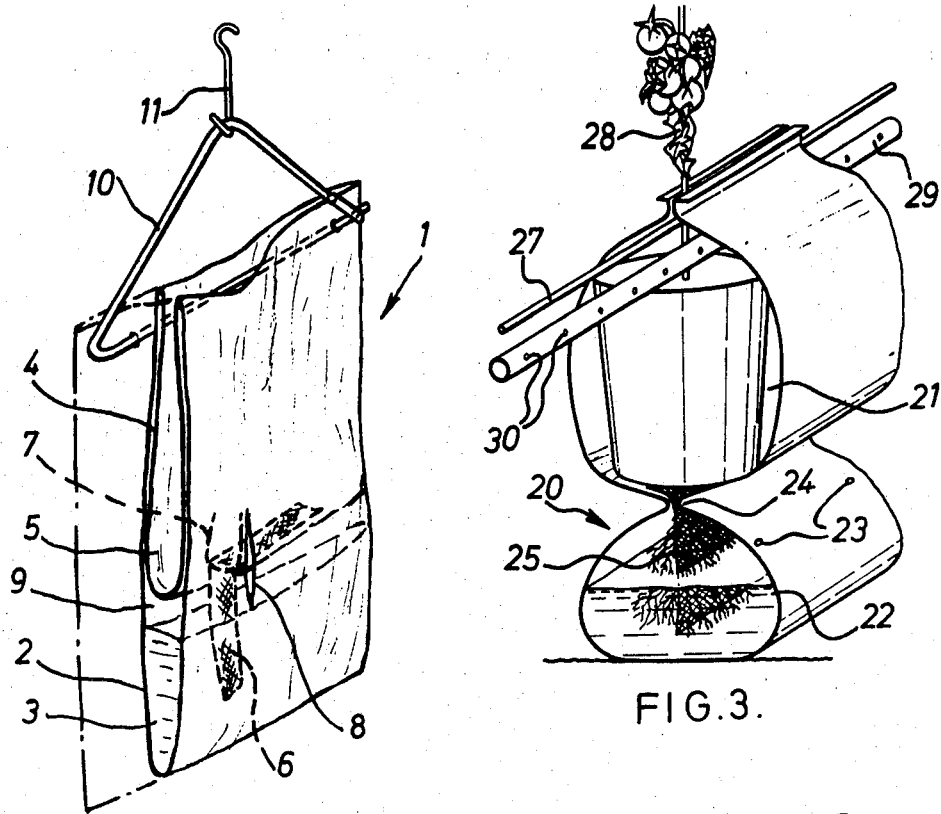
FIG. 1 is a perspective sectional view of an embodiment of the present invention.
FIG. 3 is a perspective sectional view notionally on the line 2—2 of FIG. 2 but viewed during use of the embodiment.

In the embodiment shown in FIG. 1 a flexible plant growing unit 1 comprises an outer envelope 2 the bottom of which defines a reservoir 3. An inner envelope 4 forms a root-ball container 5.

A web of capillary material 6 extends from the root container 5 to the reservoir 3 through one or more slits 7 in the bottom of the root-ball container envelope 4. The upper end of the web 6 lies along the bottom of the root container 5 and is held in position during use by the weight of the plant in the root-ball container. The capillary web 6 provides for transfer of water optionally with dissolved nutrients from the reservoir to the root-ball container. In addition to housing the capillary web 6, the slits 7 provide for drainage from the container 5 to the reservoir 3.

Longitudinal overflow slits 8 are provided in the wall of the outer envelope 2. These overflow slits 8 determine the maximum liquid level in the reservoir. In use, an air space 9 exists above the water in the reservoir 3 and is ventilated by the slits 8.

A hanger 10 is removably attached to the top of the plant growing unit 1 for suspending the unit during use. The hanger 10 comprises a length of plastics-coated wire which is bent to form a substantially triangular shape with one side of the triangle slotted through holes provided in the walls of the unit 1 and secured by bending back its end. A hook 11 can then engage with the corner of the triangle opposite the side slotted through the walls. Alternatively, a suspension wire may be led through the hanger 10 to suspend the unit.

The unit 1 is constructed from a length of blown tubular film of plastics material by tucking and folding the film to form the walls of the outer and inner envelopes 2 and 4, and at least partly welding the ends of the tube together to form the side seams of the unit. To create the reservoir, the weld has to extend over the lower part of the outer envelope, but welding right to the top may not be essential. Alternatively, to the use of tubular film, a single sheet of film may be folded in a similar manner to form the walls and the side seams edges of the sheet welded to form the outer and inner envelopes 2 and 4 of the unit 1. Furthermore, two sheets of plastics material having the same length but different widths may be employed to form the unit 1. The sheets are welded or otherwise jointed together along their edges and folded double with the narrower sheet to the inside. Side seams are then formed by, for example, welding.

These methods for producing plant growing units lend themselves to continuous production. The units may be formed by folding and welding continuous sheets of plastics material. Closely adjacent pairs of side seams are then formed at predetermined intervals along the plastics material sheets and for single units, the sheets are severed between the pairs of side seams, while in the case of a system of a plurality of such units, the sheets are severed at intervals between pairs of side seams located at a predetermined number of side seams along the length of the sheets.

The overflow slits 8 and slits 7 are preferably formed simultaneously by producing a cut through both walls of the outer envelope 2 which cut also passes through the bottom of the inner envelope 4. In this case, when the container 5 is filled or partially filled with a plant root-ball, it distorts so that the slits 7 are raised above the reservoir overflow level. In so doing, entry of liquid into the container 5 from the reservoir 3 except by capillary action is prevented and the air space 9 between this portion of the container 5 and liquid in the reservoir 3 is simultaneously achieved.

For the embodiment illustrated in FIG. 1 the strip of capillary material forming the wick 6 is then passed through a slit 7 in the bottom of the container 5. Alternatively, such a strip may be threaded through two of such slits 7 in a substantially U-shaped manner such that one or both of the two ends of strip extend into the reservoir 3 while the central portion rests on the base of the container 5 between the two slits 7.

In a further alternative, the wick 6 is omitted, and in use of the unit 1 the roots of the plant develop in the presence of moisture to bridge the air space to the level of water in the reservoir 3.

Figure 2:
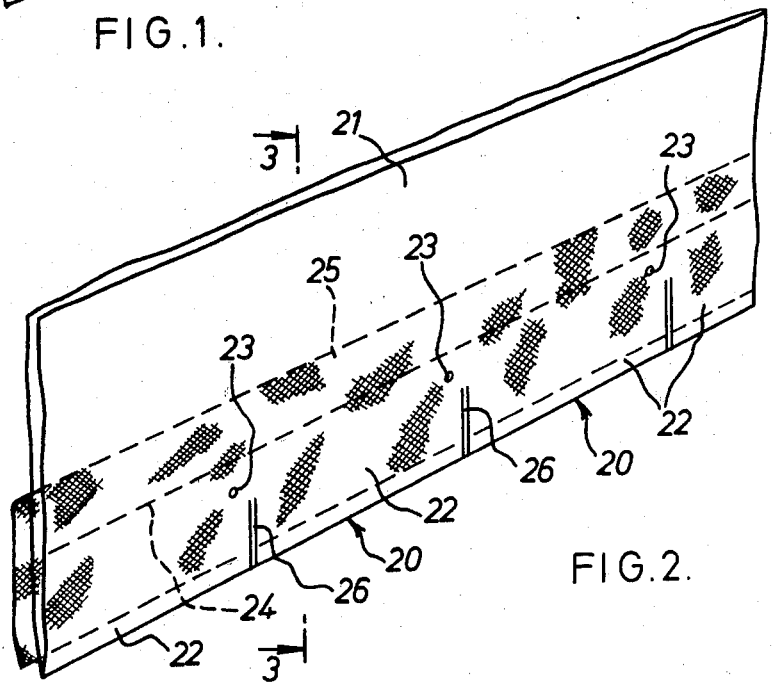
FIG. 2 is a perspective view of another embodiment of the present invention.

Referring now to FIG. 2, a system of plant growing units 20 is formed from flexible plastics material and flexible capillary material. The units 20 share a common upper compartment 21 constituting a root-ball container open for upward growth of plants when placed in the container, and have lower compartments 22 constituting a reservoir for water. The reservoirs are separated by transverse divisions formed at weld lines 26 which extend from the bottom of the units over the lower part of the sides of each lower compartment. Opposed apertures 23 formed by cutting or punching are provided for restricting the level of water in the reservoir and creating an air space. The apertures 23 are below an interrupted longitudinal division 24 between the upper and lower compartments, thus resulting in formation of the air space above the water and below the container during use of the system. It is also to be noted that the apertures 23 are above the weld lines 26, which form partial seams leaving openings which connect the reservoirs of adjacent units and thus the maximum water level is common to all the reservoirs of the system.

Between the walls forming the upper and lower compartments is a web 25 of capillary material extending from within the reservoir through the division 24 to the lower part of the root-ball container. The web 25 is positioned during manufacture of the unit which involves folding a sheet of plastics material to form the walls of the compartments 21 and 22; welding transversely of the fold-line to form adjacent pairs of partial side seams 26; and intermittently welding, stitching, stapling or otherwise securing the walls in an interrupted manner parallel to the fold-line to form the division 24. By virtue of the presence of the web 25, and the interrupted division which provides openings between the compartments, a path is provided and transfer of water from the reservoir to the root-ball is allowed, as well as growth of the roots into the lower compartment.

As will be apparent, the manufactured system of FIG. 2 is generally flat and can be rolled up, folded or otherwise prepared for handling, storage and transport to the intended user. The user then sets up the desired number of units, either in the way described for the embodiment of FIG. 1, using hangers 10, or by securing the units directly to support wires.

Thus, as shown in FIG. 3, a horizontal support wire 27 can be run between the walls of the upper compartment and the walls secured together above the wire by staples or other suitable fixings. The units are then suspended from the support wire and the plants 28 can grow out between the fixings. For plants with a short stem a modification can be employed with a parallel pair of horizontal wires. Each wall of the upper compartment is fixed to a respective wire at below the top of the upper compartment, for example, by stapling each wall to itself after wrapping it around the respective wire. The effective height of the walls of the upper compartment is reduced, and the units are suspended from both wires.

With the multiple units such as are shown in FIGS. 2 and 3 it is a simple matter to arrange for interrupted or continuous watering, using for example an irrigation hose 29 supplying water to the common upper compartment. Such a hose can hang from a support wire and have multiple openings 30 for the water.

The use of the described plant growing units offers many advantages, including a negligible loss of water through evaporation, the containment and thus efficient utilization of fertilizer or other materials dissolved in the water, a high yield with good crop quality, the profitable usage of space that might otherwise be unproductive, and freedom from soil-borne disease. The invention is especially suited for large scale cultivation of salad crops, in particular tomatoes, as well as other vegetables, fruit and flowers grown by intensive methods.

Unlike the known methods for growing plants which employ recirculation of nutrient solution, such as the Nutrient Film Technique ('NFT'), the invention does not depend on the recirculation and exact control of the water flow. Thus, in contrast to NFT and related methods, the installation costs are reduced, particularly since a sloping surface is not required. Moreover, the plants are kept clear of the water in the reservoir, and oxygen is available from air in the air space. Hence there is no need to supply oxygen by a precisely controlled nutrient. Further advantages are in the ease of manufacture and reduced cost compared to the known rigid systems for growing plants.

I claim:

1. A method for growing plants utilizing a plant growing system constructed from a sheet of flexible plastic material folded to provide opposite walls and said opposite walls being secured along a longitudinal division to form elongated upper and lower compartments, said upper compartment having an elongated top portion and constituting a multiple plant root-ball container open along said top portion for upward growth of multiple plants in said container, and said lower compartment constituting a reservoir for water, said lower compartment having level restricting means for establishing a maximum level of water in the reservoir, and means including a water carrier of flexible capillary material secured along said longitudinal division and leaving openings from said container to said reservoir in said lower compartment, said water carrier extending between said upper and lower compartments, said method comprising the steps of:

placing multiple plants in a row in said upper compartment providing said container of said system;

supporting said sheet of flexible plastic material by an elongated member extending along the elongated top portion of said upper compartment so that said upper and lower compartments hang below said supported portion;

introducing water into said container onto plants therein and draining the water through said openings into said lower compartment providing a reservoir;

establishing a maximum level of water in said reservoir by said level restricting means and producing an air space between said water level and the root-balls of said plants in said container bridged by said water carrier;

venting said air space;

supplying air and water to the root-balls of said plants in said container from said vented air space and said reservoir in said lower compartment through said openings and said water carrier for growing the plants; and replenishing the water in said lower compartment by introducing water into said container onto plants therein and draining water from said container through said openings to maintain a reservoir of water and a vented air space above the water level for supply of air and water to the root-balls of said plants in said container.

2. The method of claim 1, wherein said water contains added dissolved materials and is added intermittently or continuously during growth of said plant.

3. A method according to claim 1 utilizing an irrigation member extending through said container for introducing water.

4. A multiple plant growing system which is elongate, generally flexible and comprises upper and lower compartment sections extending the length of the system, said compartment sections being formed from an elongated folded sheet of flexible plastic material with said upper compartment section constituting a multiple plant root-ball container open for upward growth of multiple plants when placed in a row in said container and said lower compartment section constituting a reservoir for water for said plants, level restricting means including a series of openings in said sheet material in said lower compartment section for determining a maximum level of water therein and for providing a vented air space between said water level and respective root-balls of said plants when in said container, an elongated seam joining layers of said sheet material and defining a longitudinal division in said folded sheet of material between said upper and lower compartment sections, said longitudinal division having a multiplicity of openings between said upper and lower compartment sections for supplying air and water to the roots of root-balls in said container from said vented air space and the reservoir in the lower compartment section, said openings providing a path for root growth from each of said multiple plants in and water to drain from said container to said reservoir, spaced partial seams defining transverse divisions in said lower compartment section reservoir, and an elongated flexible water carrier of flexible capillary material secured along said longitudinal seam between layers of sheet material to extend between said compartment sections and bridge said air space to conduct water from said reservoir to the root-balls of plants in said container.

5. A plant growing system which is generally flexible, said system comprising multiple units joined together in series, each unit comprising upper and lower compartments of a continuous envelope, said envelope being formed from a folded continuous sheet of flexible plastic material and having opposite side walls, said flexible upper compartment constituting a plant root-ball container open for upward growth of a plant when placed in said container, and said flexible lower compartment constituting a reservoir for water, means joining said opposite side walls of said envelope for defining a longitudinal division having at least one opening between said upper and lower compartments and a transverse division having an opening between said units, level restricting means including apertures in a side wall of the lower compartments of the envelope spaced from said longitudinal division for allowing water to flow from and air to enter into the lower compartments for establishing a maximum level of water in the reservoir and producing a vented air space in said lower compartments between said water level and said longitudinal division, and a flexible water carrier of flexible capillary material extending through said longitudinal division of said envelope between said upper compartments to said lower compartments for bridging said air space while leaving a path through said openings for root growth from said container to said reservoir and for supplying air and water to the roots of a root-ball in the container from said vented air space and the reservoir in the lower compartment, and providing a path for root growth and water to drain from said container to said reservoir.

6. The plant growing system of claim 5, which further comprises means to modify heat absorption and emission by said units.

7. The plant growing system of claim 6 in which said means to modify heat absorption and emission by said units includes a cover removably placed over said units.

8. The plant growing system of claim 6 in which said sheet of flexible plastic material includes a black material as a means to modify heat absorption and emission by said units.

9. The plant growing system of claim 6 in which said sheet of flexible plastic material includes aluminum foil as a means to modify heat absorption and emission by said units.

10. The plant growing system of claim 5 in which said flexible capillary material comprises a web of fibrous material between said opposite side walls of said envelope along said longitudinal division.

11. The plant growing system of claim 5 in which said longitudinal division is provided by intermittent welds between said opposite walls of said envelope.

12. The plant growing system of claim 5 in which said transverse divisions are formed by welds between opposite side walls of said envelope along lines which provide partial seams in the lower part of the sides of each lower compartment.

13. A plant growing system according to claim 5 in which said openings in said transverse divisions connect reservoirs of adjacent units so that the maximum water level is common to adjacent reservoirs of the system.

14. A plant growing system according to claim 13 in which said transverse divisions are formed by welds between said opposite side walls of said envelope providing partial seams leaving openings which connect reservoirs of adjacent units so that the maximum water level is common to adjacent reservoirs of the system.

* * * * *